(12) United States Patent
Wang et al.

(10) Patent No.: US 6,450,162 B1
(45) Date of Patent: Sep. 17, 2002

(54) INDIRECT RADIANT HEATING DEVICE

(75) Inventors: Robert Wang, Wissous; Jean-Claude Montgermont, Le Mee sur Seine, both of (FR)

(73) Assignee: Stein Heurtey, Ris Orangis (FR)

( * ) Notice: Subject to any disclaimer, the term of this patent is extended or adjusted under 35 U.S.C. 154(b) by 0 days.

(21) Appl. No.: 09/729,849

(22) Filed: Dec. 6, 2000

(51) Int. Cl.⁷ .............................................. F23D 21/00
(52) U.S. Cl. ..................... 126/91 A; 431/207; 431/238; 431/243; 432/225; 432/209
(58) Field of Search ............................. 126/91 A, 91 R; 432/224, 225, 209; 431/11, 215, 207, 238, 239, 243, 247, 284, 285, 248

(56) References Cited

U.S. PATENT DOCUMENTS 2,843,107 A * 7/1958 Cipriani ..................... 126/91 A
4,929,173 A * 5/1990 Jacobs ....................... 126/91 A
5,483,948 A * 1/1996 Van Der Veen ........... 126/91 A

FOREIGN PATENT DOCUMENTS

FR 2630195 * 10/1989 ................ 126/91 A
FR 2680226 * 2/1993 ................ 126/91 A

* cited by examiner

Primary Examiner—James C. Yeung
(74) Attorney, Agent, or Firm—Connolly Bove Lodge & Hutz LLP

(57) ABSTRACT

An indirect radiant heating device burns gaseous or liquid fossil fuels for the heat treatment of running products, such as bars, tubes, and strips kept in a protective atmosphere. The device includes a radiant cassette of parallelepipedal shape, with a continuous radiating surface whose cross section, in a plane perpendicular to the axis of the cassette, is delimited by a continuous line which falls inside a rectangle whose height/width ratio is greater than 1.5.

2 Claims, 5 Drawing Sheets

INDIRECT RADIANT HEATING DEVICE

FIELD OF THE INVENTION

The present invention relates to a device for the indirect radiant heating of running products, by means of the combustion of gaseous or liquid fossil fuels.

BACKGROUND OF THE INVENTION

The present invention is intended more particularly for heat treatment furnaces in which the products (such as bars, tubes, strips and parts, for example) are heated on the move, in an environment which preferably must be free of certain gaseous components that result from the combustion. The invention may, for example, apply to the heating of steel strip running through heat treatment furnaces heated by fossil fuel and in which the strip is kept under a protective atmosphere.

According to the current state of the art, the indirect heating by fossil fuel of running products in a protective environment is generally performed using radiant tubes. FIG. 1 of the appended drawings diagrammatically depicts, in section on a vertical plane, one embodiment of so-called thimble-type radiant tubes which are used in installations with a low heat capacity. The tube, of cylindrical shape, is positioned between the walls of a furnace of width L. Mounted in the internal cavity of the tube is a concentric combustion tube inside which a burner is positioned and upstream of which a heat recuperator is mounted. Fuel is injected in the direction of the arrow G, oxidizer is injected in the direction of the arrow A and the flue gases are removed in the direction of the arrow F.

This exemplary embodiment of radiant tubes is characterized by a small volume in which combustion takes place, and this has the drawback of forming nitrogen oxides (NOx) in large quantity and of placing significant thermal stress on the combustion tube because of the high variation in temperature along this tube.

In industrial installations demanding the installation of significant heating power, this solution cannot be envisaged given that the number of thimble-type radiant tubes and of their associated burners needed would be very high and their cost excessive.

This is why, for high-capacity installations, use is made of multiple-strand (2-strand or 4-strand) radiant tubes. FIG. 2 of the appended drawings diagrammatically depicts one exemplary embodiment of a four-stranded radiant tube also known as a "W tube", this tube, of circular cross section, being positioned between the walls of the furnace of width L. Fuel is injected in the direction of the arrow G, oxidizer is injected in the direction of the arrow A and the flue gases are removed in the direction of the arrow F.

The burner is mounted in the radiant tube, on the entry strand thereof and the heat recuperator is positioned on the strand via which the products of combustion exit. Combustion takes place in a cross section and in a volume which are larger than were the case in a thimble-type radiant tube illustrated in FIG. 1, and the absence of the internal combustion tube makes the device less expensive for the same overall thermal power. By contrast, the great length of such a radiant tube and the inevitable temperature differences between these various strands lead to a tendency to deformation generated by the thermal stresses and by the means supporting the intermediate strands. The systems for supporting such radiant tubes are complicated to produce and, in this respect, reference may be made to EP-A-0 383 687 which illustrates one embodiment of such support means.

The surface temperature differences of the tube along its entire length generally give rise to differences in heating across the width of the heated product, for example a strip, particularly between its center and its edges, and this may result in problems in controlling the tension across the width of such a strip.

In the particular case of a furnace for the vertical treatment of a strip as illustrated in FIG. 3, in which the tubes are placed between the strands of the strip, these radiant tubes according to the prior art have another drawback, namely a form factor which is not optimized for radiant heating because of the presence of gaps between the various tubes or between the various strands of the same tube.

The present invention proposes to provide a device for indirect radiant heating which does not have the drawbacks of the solutions of the prior art which have been examined hereinabove. This device has been designed to simultaneously solve the following various technical problems:

reducing the emissions of NOx;

improving the uniformity of the temperature of the surface radiating towards the products that are to be heated;

obtaining a form factor which is optimized for heating by radiating towards the products that are to be heated.

Consequently, this invention relates to a device for the indirect radiant heating, by means of the combustion of gaseous or liquid fossil fuels, of running products, such as bars, tubes, strips and parts for example, kept under a protective atmosphere, characterized in that it is produced in the form of a radiant cassette of essentially parallelepipedal shape, with a continuous radiating surface whose cross section, in a plane perpendicular to the axis of the cassette, is delimited by a continuous line which falls inside a rectangle whose height/width ratio is greater than 1.5. The radiant cassette includes a combustion tunnel equipped with a burner positioned inside the cassette, and the burner includes at least two fossil fuel injectors arranged parallel to the plane of the main face of the cassette so as to spread the flame parallel to the face. This produces a uniform distribution of the flame temperature parallel to the plane.

According to other embodiments of the invention, the cassette may be designed to operate according to the principle of so-called thimble-type radiant tubes or of U-shaped, W-shaped or E-shaped radiant tubes.

According to the invention, the device may be equipped with a heat recuperator on at least two faces of the cassette and over part of the length of these faces, it being possible for this recuperator to be of the tubular or finned type and it being possible for this recuperator to be used for heating the fuel or the oxidizer.

Other features and advantages of the present invention will become apparent from the description given hereinafter with reference to the appended drawings which illustrate various nonlimiting exemplary embodiments thereof.

DETAILED DESCRIPTION OF THE INVENTION

Figure 1:
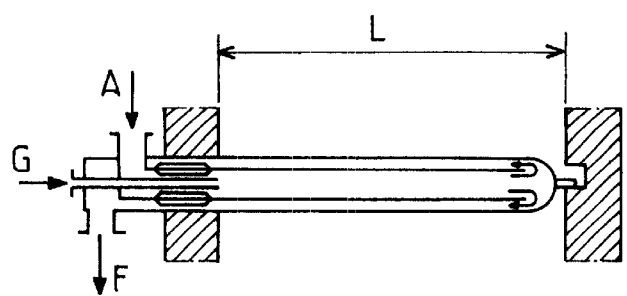
FIG. 1 is a diagrammatic view of a first prior art construction.
Figure 2:
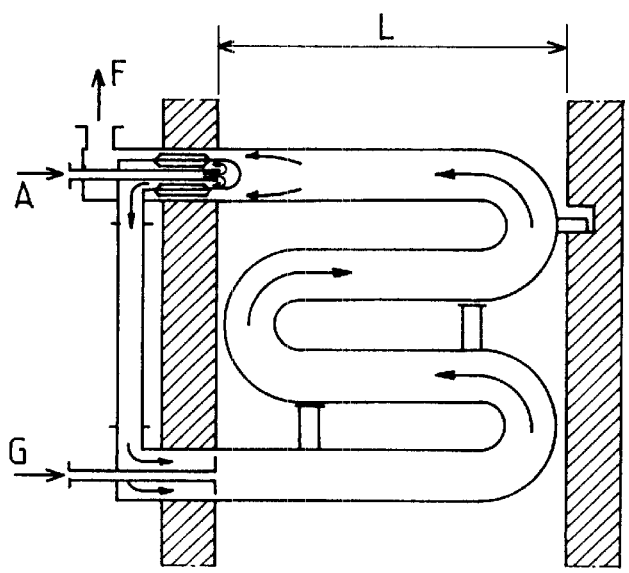
FIG. 2 is a diagrammatic view of a second prior art construction.
Figure 3:
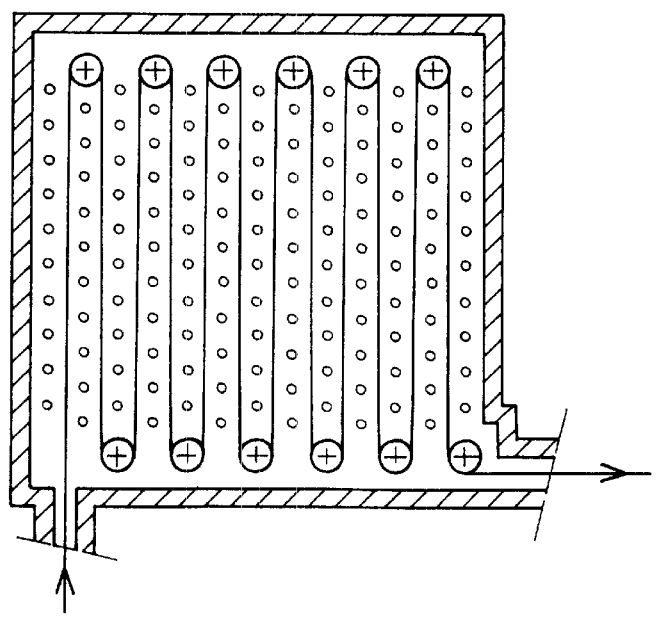
FIG. 3 is a diagrammatic cross-sectional view of a prior art furnace showing the heat treatment of a metal strip.
Figure 4:
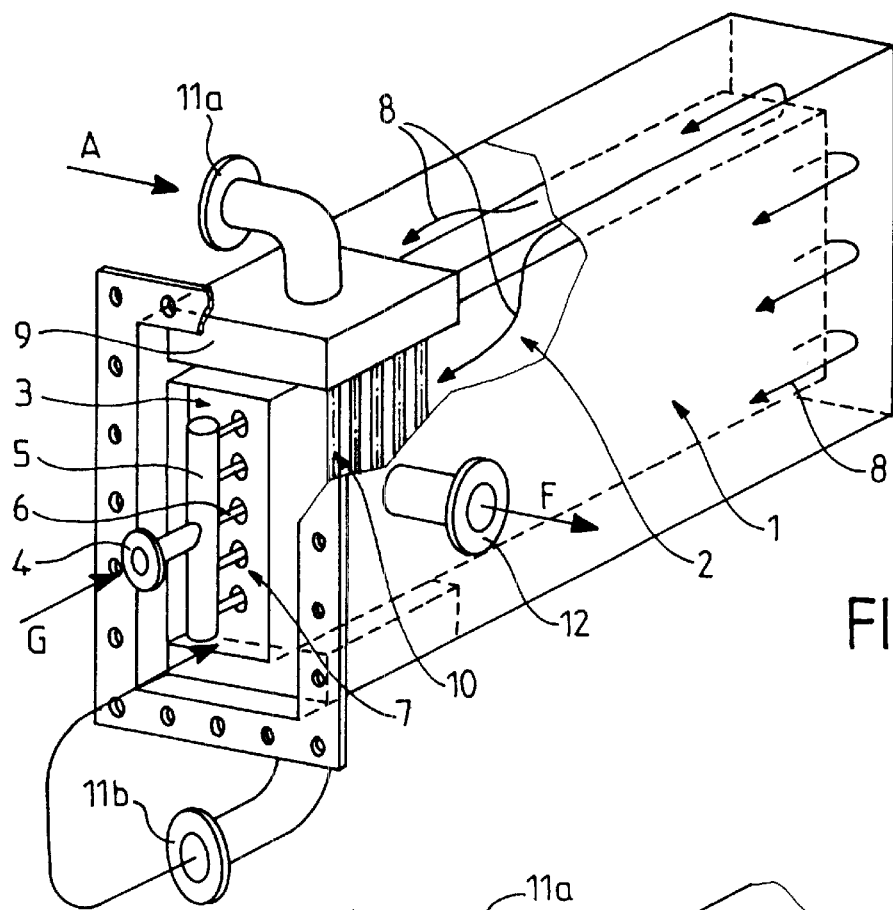
FIG. 4 is a diagrammatic perspective view depicting a first exemplary embodiment of the device that is the subject of the invention.

Reference is first of all made to FIG. 4 which illustrates a first exemplary embodiment of the device that is the subject of the invention. It can be seen that this device is in the form of a cassette denoted overall by the reference 1 and which is designed to transmit heat by radiation to the products that are to be heated. The continuous external section of this cassette 1 falls inside a rectangle with a height/width ratio greater than 1.5, and inside the cassette there is a combustion tunnel 2 in which a fossil fuel burner 3 is mounted. In this nonlimiting exemplary embodiment, the cross section of the combustion tunnel 2 is in a shape similar to that of a rectangle.

The burner, in this exemplary embodiment, operates on gaseous fuel delivered by an inlet 4 which supplies a distribution manifold 5 opening onto a number of gas injectors 6. These injectors are arranged parallel to the plane of the main face of the cassette so as to spread the flame out parallel to the said face and producing a uniform distribution of flame temperature parallel to the said plane.

The combustion air is delivered to the burner 3 by an air distributor 7. Of course, this burner is equipped with elements for sighting inside the combustion tunnel 2 and with devices for igniting and controlling the flame, produced in the conventional way and therefore not depicted in the drawing.

All the flames from the various injectors develop together inside the combustion tunnel 2 in a plane parallel to the large face of the cassette 1 and the products of combustion are conveyed towards the exit, between the combustion tunnel 2 and the cassette 1 in the direction of the arrows 8. In this exemplary embodiment, a recuperator is provided, this being placed between the cassette and the combustion tunnel more or less at the location of the burner 3. This recuperator in this instance consists of two manifolds 9 connected by bundles of tubes 10 surrounding the combustion tunnel and manifolds 11a and 11b for introducing cold air and for removing hot air, respectively. The cold air is therefore introduced by the manifold 11a in the direction of the arrow A, it is heated by the products of combustion in the recuperator 9, 10, and the hot air thus produced is taken out by the second manifold 11b to be directed into the space upstream of the air distributor 7 so as to heat the combustion air. The combustion gases, having passed through the recuperator, are removed by an exit 12 (arrow F) to an extraction system not depicted.

Figure 5:
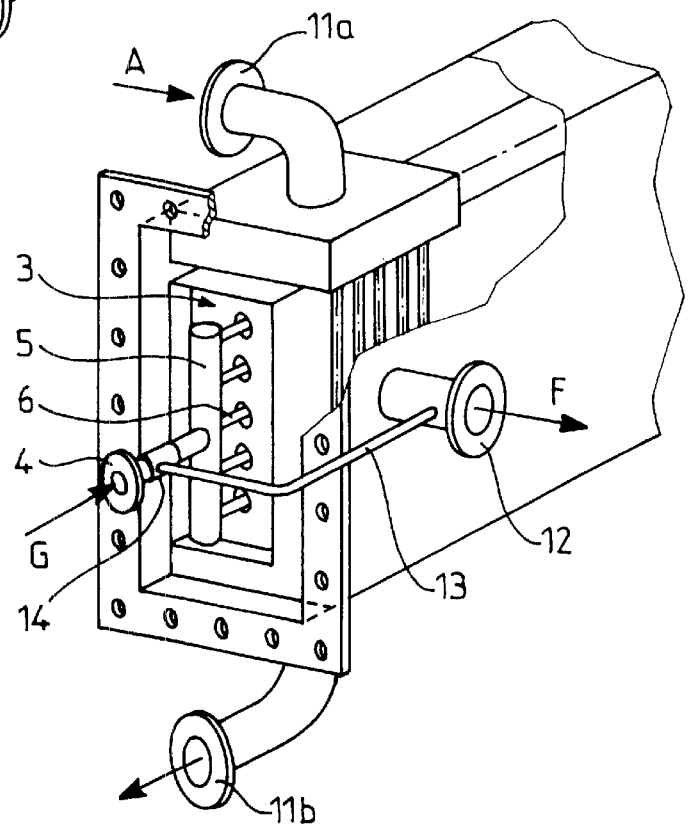
FIG. 5 is a diagrammatic and perspective part view illustrating an alternative form of imbodiment of the device illustrated in FIG. 4.

According to the present invention, means are provided to recirculate some of the flue gases through the fuel or the oxidizer so as to spread the flame out to further improve the uniformity and/or the emission of pollutants such as NOx, for example. Thus, in the alternative form of embodiment of the invention illustrated in FIG. 5, the removal 12 of the combustion gases has a branch 13 which is connected to an ejector 14 mounted on the gaseous fuel inlet 4 so as to dilute the fuel gas with products of combustion so as to obtain an additional reduction in the nitrogen oxides produced during combustion.

It is of course possible to envisage numerous alternative forms of embodiment of the cassette 1 without in any way changing the fundamental features of the invention. Thus, this cassette may have rounded top and bottom walls, the side walls may be profiled with sinusoidal, trapezoidal or some other form of corrugation so as to increase the area radiating onto the product that is to be heated and the convection heat exchangers. The bottom of this cassette may be flat or domed, and the curvature of the doming may be concave or convex.

The burner 3 may be equipped with injectors for liquid fuel atomized by any mechanical or pneumatic means. The distributor 7 for the combustion air may have air passage openings or nozzles concentric with the fuel injectors or alternatively may have orifices arranged in circles surrounding the injectors or may even be in the form of rows or grids made up of straight lines. The combustion air distribution orifices may be pierced in sheets of steel or other materials, it being possible for these sheets to be flat, curved or V-shaped.

The recuperator 10 may be of the finned type or may be any other similar device obtained by moulding or by assembling sheet metal on at least two faces of the combustion tunnel.

Figure 6:
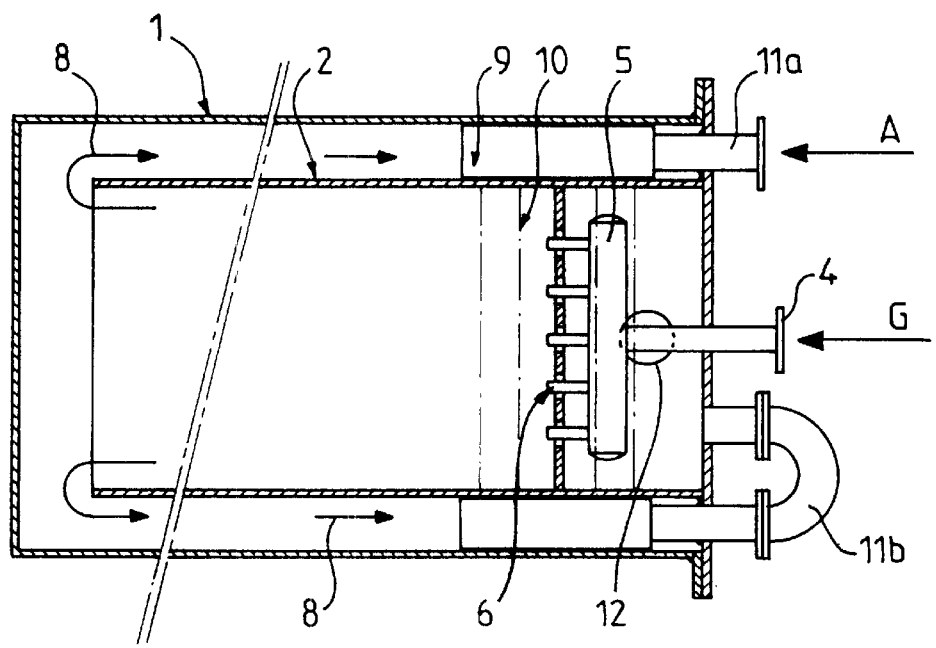
FIGS. 6 and 7 depict, in vertical axial section, two alternative forms of embodiment of the device that is the subject of the invention.
Figure 7:
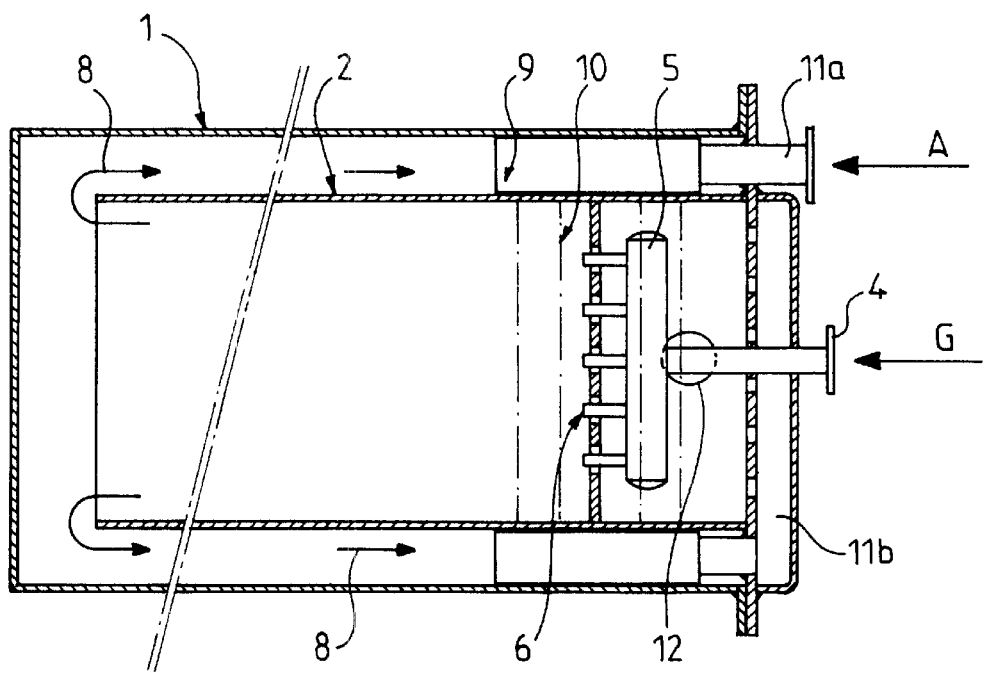

Finally, it is possible to envisage numerous forms of embodiment of the recuperator air inlet and outlet means, and of the burner hot air supply means. FIGS. 6 and 7 illustrate two alternative forms of embodiment of the hot air circuit between the manifold 11b that discharges hot air from the recuperator 10 and the combustion air distributor 7.

It will also be noted that the collection and removal of the combustion gases may be installed on one of the faces of the radiant cassette 1.

Of course, the device that is the subject of the invention may be produced without an internal recuperator; it may, for example, be connected to an external recuperator.

Figure 8:
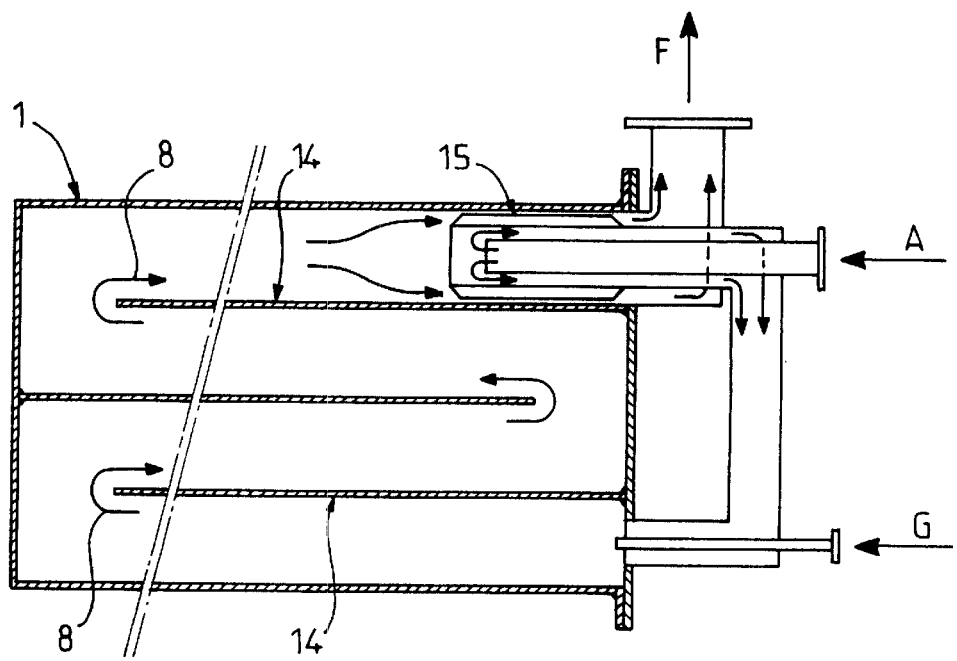
FIGS. 8 and 9 are views similar to FIGS. 6 and 7 illustrating two more alternative forms of embodiment of the device which is the subject of the invention: the alternative form according to the prior art and the alternative form according to FIG. 9 employing an operating principle corresponding to that of E-shaped radiant tubes of the prior art.
Figure 9:
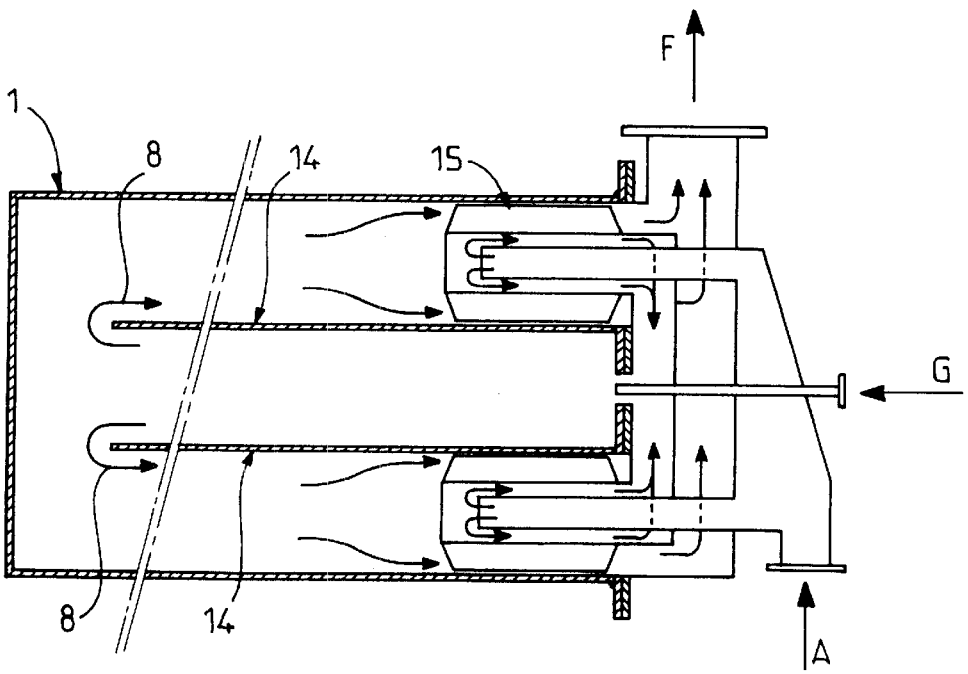

Reference is now made to FIGS. 8 and 9 which illustrate two alternative forms of embodiment of the device of the present invention.

FIG. 8 depicts a radiant cassette 1, the external shape of which is continuous and which falls inside a rectangle with a height/width ratio greater than 1.5, and whose operating principle corresponds to that of W-shaped radiant tubes according to the prior art. Fuels are injected in the direction of the arrow G, oxidizers are injected in the direction of the arrow A and products of combustion are removed in the direction of the arrow F. The burner with which this radiant cassette is equipped may be of the axisymmetric type. The internal volume of the cassette 1 has partitions 14 to cause the combustion gases to circulate in the direction of the arrow 8. There is a heat recuperator 15 to heat the oxidizer injected in the direction of the arrow A. Of course, this alternative form of embodiment may be adapted to suit U-shaped or any other shaped radiant tubes.

Figure 10:
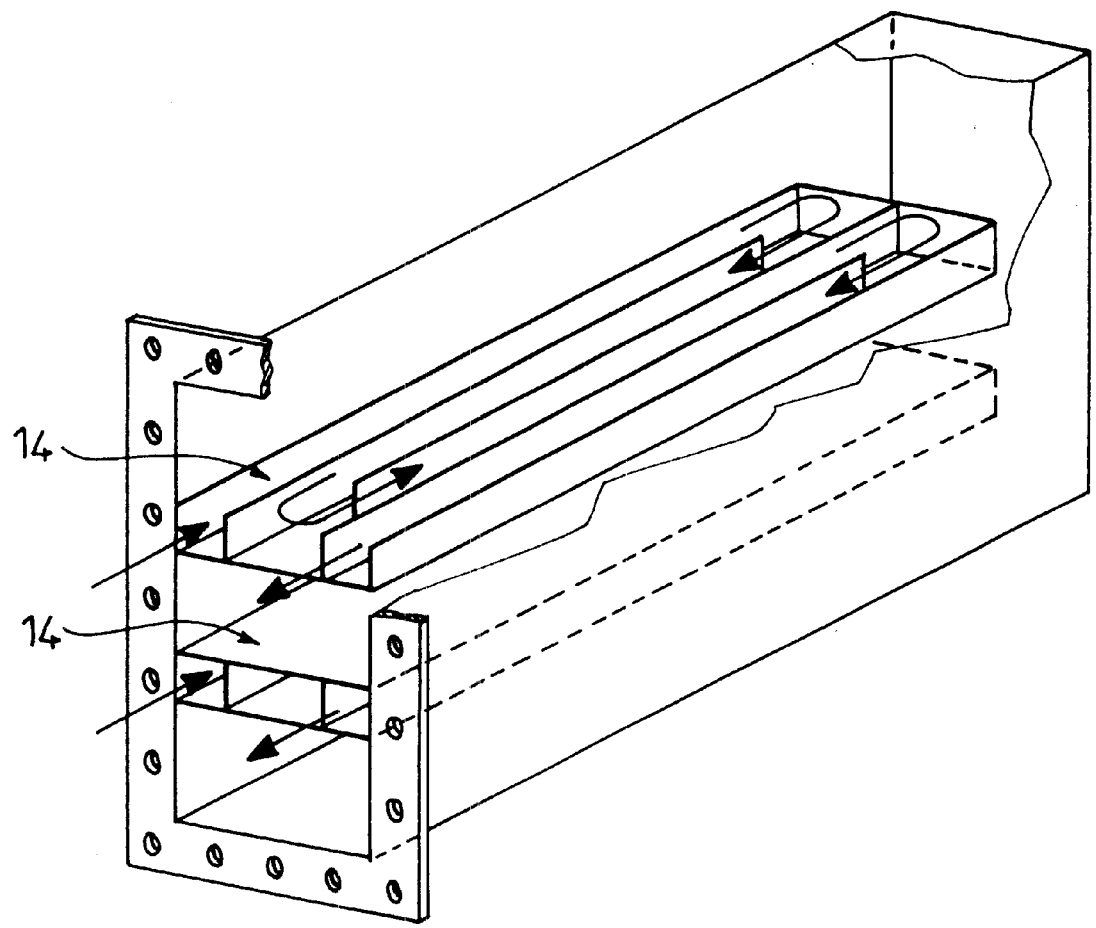
FIG. 10 is a perspective view with partial cut away illustrating another exemplary form of embodiment of the invention.

FIG. 10 shows one or more of the internal partitions 14 which may be produced in the form of a prismatic chamber, possibly partitioned or in the form of a tubular circuit, occupying all or part of this partition and inside which a cooling fluid or some of the fuel or some of the oxidizer flows so as to improve the mechanical or thermal integrity according to the temperature levels that the partitions reach; the circuit being used alone or in conjunction with the heat recuperators.

FIG. 9 depicts another alternative form of the embodiment, the operating principle of which corresponds to that for an E-shaped tube. The radiant cassette 1 has the same features as the radiant cassette illustrated in FIG. 8. Fuel is injected in the direction of the arrow G, oxidizers are injected in the direction of the arrow A, and the products of combustion are removed in the direction of the arrow F. The burner may also be of the axisymmetric type. The internal volume of the cassette 1 is divided by partitions 14 so as to cause flow of the combustion gases from the burner located in the central branch towards the two lateral branches in the direction of the arrows 8. Heat recuperators 15 are provided to heat the combustion air injected in the direction of the arrow A. Here again, as shown in FIG. 10, one or more of the partitions 14 may be produced in the form of a prismatic chamber or in the form of a tubular circuit occupying all or part of this partition and inside which a cooling fluid or some of the fuel or some of the oxidizer flows so as to improve the mechanical or thermal integrity according to the temperature levels that the partitions reach; the circuit being used alone or in conjunction with the heat recuperators.

According to the invention, one or more walls of the radiant cassette 1 may be produced according to the principle set out in FIG. 10, in the form of a prismatic chamber or of a tubular circuit occupying all or some of the said wall and inside which a cooling fluid or some of the oxidizer flows so as to limit the radiation of the wall, particularly near a roll or near a wall of the furnace; the circuit being used alone or in conjunction with the heat recuperators to heat the fuel or the oxidizer.

The table below gives, by way of indication, a comparison between the characteristics of the radiant tubes produced according to the prior art and those obtained by the use of a radiant cassette produced according to the preferred embodiment of the invention. In all instances, the same furnace width: 2 meters and the same tube outside diameter and 164 mm for radiant tubes produced according to the prior art, have been adopted.

The cross section of the tunnel in which combustion takes place is considerably increased: this plays a part both in reducing the emissions of NOx and in improving the uniformity of the temperature of the surface radiating towards the products that are to be heated.

The form factor for radiation towards the products which are to be heated is improved: this either allows a reduction in the heating length of the furnace or allows a reduction in the operating temperature of the cassettes by comparison with radiant tubes.

The improvement in the uniformity of the temperature reduces the magnitude of the thermal stresses in the radiating walls of the cassette and therefore their deformation.

The improvement in the uniformity of the surface temperature of the radiant cassette makes it possible to reduce the temperature gradient across the width of the strip, and therefore improve the control over its tension.

The improvement in the uniformity of the surface temperature of the radiant cassette allows the cassette to operate a higher average temperature, and therefore makes it possible to reducethe number of radiant cassettes for the same amount of transmitted flux and, consequently, to reduce the length of the furnace.

It of course must remain clearly understood that the present invention is not restricted to the embodiments described and/or mentioned hereinabove but that it encompasses all alternative forms thereof.

What is claimed is:

1. An indirect radiant heating device that burns gaseous or liquid fossil fuel for the heat treatment of running metal products, the device comprising:

a radiant cassette of parallelepipedal shape, with a continuous radiating surface whose cross section, in a plane perpendicular to the axis of the cassette, is defined by a continuous line which falls inside a rectangle whose height/width ratio is greater than 1.5;

a combustion tunnel located inside the radiant cassette;

a burner positioned inside the cassette and having at least two fossil fuel injectors arranged parallel to a plane of a main face of the cassette so as to spread the flame parallel to the said face, producing a uniform distribution of the flame temperature parallel to the said plane;

a heat recuperator mounted between at least two faces of the cassette and over part of a length of the faces for heating fuel or oxidizer supplied to the device.

2. A heating device according to claim 1, wherein the bottom of the cassette is flat.

|  |  |  |  | Combustion space | | | |
|---|---|---|---|---|---|---|---|
| Type of tube | Power (kW) | Diameter (mm) | Cross section ($m^2$) | Length (m) | Volume ($m^3$) | Power/ $m^2$ ($kW/m^2$) | Power/ $m^2$ ($kW/m^3$) |
| Thimble | 35 | 106 | 0.0088 | 1.7 | 0.015 | 3,980 | 2,330 |
| 2-strand ("U") | 75 | 154 | 0.0186 | 3.9 | 0.073 | 4,030 | 1,030 |
| 4-strand ("W") | 130 | 154 | 0.0186 | 7.1 | 0.132 | 6,990 | 985 |
| Cassette | 130 | 104 × 740 | 0.0770 | 1.8 | 0.139 | 1,690 | 935 |

This table shows that the power per cubic meter of volume and the power per square meter of passage cross section of the flame are lower than those of the conventional radiant tubes, which ensures better flame development and makes it possible to limit the production of NOx and improve the uniformity of the flame temperature, and therefore of the radiating walls.

By comparison with the indirect radiant heating device according to the prior art, using radiant tubes, the present invention affords the following particular advantages:

* * * * *